US010366285B2

(12) United States Patent
Custer et al.

(10) Patent No.: US 10,366,285 B2
(45) Date of Patent: Jul. 30, 2019

(54) METHOD AND APPARATUS FOR DETERMINING THE OPERATION OF A VEHICLE SAFETY SYSTEM

(71) Applicant: Bendix Commercial Vehicle Systems LLC, Elyria, OH (US)

(72) Inventors: Robert J Custer, Westlake, OH (US); William P Amato, Avon, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 501 days.

(21) Appl. No.: 14/682,137

(22) Filed: Apr. 9, 2015

(65) Prior Publication Data
US 2016/0300106 A1    Oct. 13, 2016

(51) Int. Cl.
| G06K 9/00 | (2006.01) |
| B60R 11/04 | (2006.01) |
| B60R 25/31 | (2013.01) |
| B60R 25/40 | (2013.01) |
| H04N 17/00 | (2006.01) |

(52) U.S. Cl.
CPC ..... *G06K 9/00577* (2013.01); *G06K 9/00369* (2013.01); *G06K 9/00805* (2013.01); *H04N 17/002* (2013.01); *G06K 9/00798* (2013.01); *G06K 9/00818* (2013.01)

(58) Field of Classification Search
CPC ......... B60W 2420/52; B60W 2420/42; B60W 2550/10; B60W 50/14; B60W 2710/18; B60W 50/10; B60W 10/18; B60W 2050/146; B60W 2710/20
See application file for complete search history.

(56) References Cited

U.S. PATENT DOCUMENTS

| 5,325,096 A | 6/1994 | Pakett |
| 5,517,196 A | 5/1996 | Pakett |
| 6,121,916 A | 9/2000 | McDade |
| 6,127,965 A | 10/2000 | McDade |

(Continued)

OTHER PUBLICATIONS

Bendix Commercial Vehicle Systems LLC, SD-13/3333 "Bendix Wingman ACB (Active Cruise with Braking)", Service Data Sheet, May 2012, 52 pages, Bendix Commercial Vehicle Systems LLC, United States.

(Continued)

*Primary Examiner* — Dave Czekaj
*Assistant Examiner* — Kehinde Abimbola
(74) *Attorney, Agent, or Firm* — Cheryl Greenly; Brian Kondas; Eugene Clair

(57) ABSTRACT

Various embodiments of an apparatus and method for determining the operation of a vehicle safety system are disclosed. In one embodiment, the controller for a safety system comprises a sensor input for receiving a signal from a safety system sensor; a camera input for receiving a signal from a camera; and a processor having control logic. The control logic is capable of receiving the sensor signal indicating an absence of detected objects in a field of view of the safety system sensor; receiving the camera signal indicating at least one non-vehicle object identified in the field of view of the camera; and maintaining the active vehicle safety system as active in response to the sensor signal indicating the absence of detected objects and the camera signal indicating the identification of at least one visual non-vehicle object.

15 Claims, 4 Drawing Sheets

(56) References Cited

U.S. PATENT DOCUMENTS

| | | | |
|---|---|---|---|
| 6,414,623 B1 | 7/2002 | Ashihara | |
| 6,611,227 B1 | 8/2003 | Nebiyeloul-Kifle | |
| 6,686,872 B2 | 2/2004 | Vacanti | |
| 6,946,978 B2 * | 9/2005 | Schofield | G01C 21/00 340/988 |
| 7,164,117 B2 * | 1/2007 | Breed | B60R 21/01516 250/208.1 |
| 7,737,882 B2 | 6/2010 | Matsuoka | |
| 7,973,701 B2 | 7/2011 | Lohmeier | |
| 8,098,192 B1 | 1/2012 | Wichgers | |
| 8,265,861 B2 * | 9/2012 | Ikeda | G08G 1/09675 701/117 |
| 8,466,806 B2 * | 6/2013 | Schofield | B60Q 1/346 340/435 |
| 8,604,968 B2 * | 12/2013 | Alland | B60R 1/00 342/22 |
| 8,803,726 B2 | 8/2014 | Heilmann | |
| 9,174,574 B2 * | 11/2015 | Salomonsson | B60R 21/0134 |
| 2003/0236622 A1 * | 12/2003 | Schofield | G01C 21/00 340/995.28 |
| 2006/0208169 A1 * | 9/2006 | Breed | B60N 2/002 250/221 |
| 2006/0244576 A1 * | 11/2006 | Sugie | B60R 25/1004 340/429 |
| 2007/0109653 A1 * | 5/2007 | Schofield | B60N 2/002 359/604 |
| 2008/0215232 A1 * | 9/2008 | Ikeda | G08G 1/09675 701/117 |
| 2010/0049375 A1 * | 2/2010 | Tanimoto | B60T 7/12 701/1 |
| 2011/0163904 A1 * | 7/2011 | Alland | B60R 1/00 342/1 |
| 2012/0050093 A1 | 3/2012 | Heilmann | |
| 2013/0038484 A1 * | 2/2013 | Ohkado | G01S 13/345 342/70 |
| 2013/0099908 A1 * | 4/2013 | Salomonsson | B60R 21/0134 340/425.5 |
| 2014/0214255 A1 | 7/2014 | Dolgov | |
| 2014/0233805 A1 | 8/2014 | Faber | |
| 2015/0145664 A1 * | 5/2015 | You | B60W 30/12 340/438 |
| 2016/0003946 A1 * | 1/2016 | Gilliland | G01S 17/10 356/5.01 |
| 2016/0052474 A1 * | 2/2016 | Salomonsson | B60R 21/0134 701/45 |

OTHER PUBLICATIONS

Bendix Commercial Vehicle Systems LLC, SD-13/4869, "Bendix EC-60 ABS/ATC/ESP Controllers (Advanced)", Service Data Sheet, Jun. 2013, 60 pages, Bendix Commercial Vehicle Systems LLC, United States.

Bendix Commercial Vehicle Systems LLC, SD-64/4976, "AutoVue Lane Departure Warning (LDW) System by Bendix CVS", Service Data Sheet, Nov. 2014, 16 pages, Bendix Commercial Vehicle Systems LLC, United States.

* cited by examiner

METHOD AND APPARATUS FOR DETERMINING THE OPERATION OF A VEHICLE SAFETY SYSTEM

BACKGROUND

The present invention relates to embodiments of an apparatus and method for determining the operation of a vehicle safety system. Commercial vehicles often include safety systems such as lane departure warning, active cruise control with braking and stability control. Each of these systems includes sensors and/or cameras configured for providing input to facilitate the functions of the safety system. If one of the sensors and/or cameras is determined to not be working properly because no images or objects are detected within a predetermined time period, the vehicle safety system is deactivated. In some instances, the safety system will not be re-enabled until the vehicle is powered on again, the fault codes are cleared and/or the sensor is replaced. Shutting down the operation of the vehicle safety system may not be desirable in certain situations, such as long stretches of country highway, where simply the lack of detectable objects in the field of view of the sensor is causing the sensor to not detect an object.

SUMMARY

Various embodiments of a controller for determining the operation of a vehicle safety system are disclosed. In accordance with one aspect the controller for a safety system comprises a sensor input for receiving a signal from a safety system sensor; a camera input for receiving a signal from a camera; and a processor having control logic. The control logic is capable of receiving the sensor signal indicating an absence of detected objects in a field of view of the safety system sensor; receiving the camera signal indicating at least one non-vehicle object identified in the field of view of the camera; and maintaining the active vehicle safety system as active in response to the sensor signal indicating the absence of detected objects and the camera signal indicating the identification of at least one visual non-vehicle object. In another embodiment, a controller for a safety system on a vehicle comprises a sensor input for receiving a signal from a safety system sensor; an input for receiving a signal indicative of an environmental condition; a camera input for receiving a signal from a vehicle mounted camera; and a processor having control logic. The control logic is capable of receiving the sensor signal indicating an absence of detected objects in the field of view of the safety system sensor; receiving the environmental condition signal indicating the environment is outside a predetermined value; receiving the camera signal indicating a camera fault; and deactivating the active vehicle safety system in response to the sensor signal indicating the absence of detected objects, the environmental condition signal indicating the environment does not meet a predetermined value and the camera signal indicating a camera fault.

In accordance with another aspect, a method for determining the status of a sensor in an active vehicle safety system comprises receiving a sensor signal indicating the absence of detected objects in the field of view of the sensor; receiving a camera signal indicating at least one visual object identified in the field of view of the camera; and maintaining the active vehicle safety system as active in response to the sensor signal indicating the absence of detected objects and the camera signal indicating at least one visual object.

In accordance with another aspect, a system for determining the status of a sensor in an active vehicle safety system comprises a sensor for detecting objects in a field of view of the sensor; a camera for identifying objects in a field of view of the camera; and a controller in communication with the sensor and the camera. The controller has control logic capable of receiving a sensor signal indicating of the absence of detected objects in the field of view of the sensor; receiving a camera signal indicating at least one non-vehicle object identified in the field of view of the camera; and maintaining the active vehicle safety system as active in response to the sensor signal and the camera signal.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION

Figure 1:
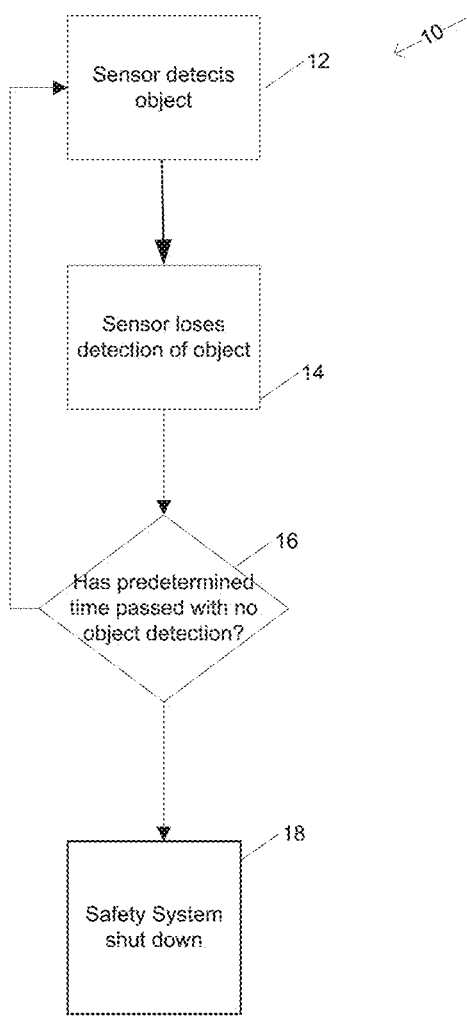
FIG. 1 illustrates a prior art method of determining the operation of a sensor in a vehicle safety system.

A simplified conventional method of determining the operation of a vehicle safety system is shown in FIG. 1. The method 10 begins at step 12 when a sensor of the vehicle safety system detects an object in front of or around the vehicle. In step 14, the sensor loses the detection of the object unexpectedly. In step 16, the system determines if a predetermined time period has passed since the loss of the detected object and either the detection of a new object or reestablishment of the prior object detection. The predetermined time period could be as short as thirty seconds or as long as five minutes. If the system detects an object within the predetermined time period, the method 10 returns to step 12. If the system does not detect an object within the predetermined time period, the vehicle safety system is shut down in step 18 because the sensor may no longer be reliable. One of the limitations of a vehicle safety system equipped with a sensor, such as a radar, is the loss of reliable detected objects due to reasons such as low reflectivity, object size, shape or orientation with respect to the radar.

Figure 2:
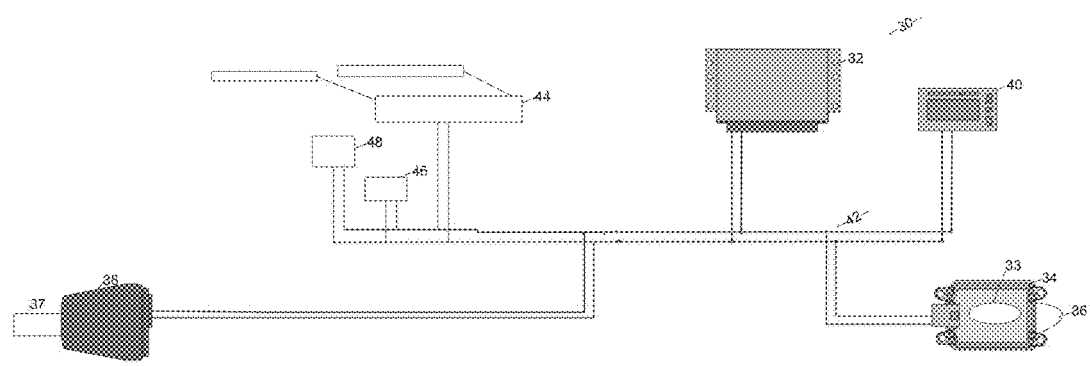
FIG. 2 illustrates a schematic representation of a vehicle equipped with a vehicle safety system and sensors according to an example of the present invention.

With reference to FIG. 2, a representation of a vehicle safety system 30 is shown. The vehicle safety system 30 includes a brake controller 32. The brake controller 32 controls the braking system of the vehicle, such as anti-lock braking and stability control functions and may be a Bendix® EC-60™ advanced controller from Bendix Commercial Vehicle Systems LLC of Elyria, Ohio. The brake controller 32 communicates with a vehicle communications bus 42. The communications bus 42 may use a standardized communications protocol, such as SAE J1939, or may be a proprietary communications bus available only to the components of the safety system 30.

The vehicle safety system 30 includes a main controller 34. The main controller 34 includes functionality for controlling an active safety system, such as the Bendix® Wingman® Active Cruise with Braking System from Bendix Commercial Vehicle Systems LLC of Elyria, Ohio. The main controller 34 has a processor with control logic 33 for determining the operation of a sensor in the safety system 30. The main controller 34 will then either maintain the safety system 30 as active or deactivate the safety system 30, as will be further described. The main controller 34 communicates with the brake controller 32 via the communications bus 42.

A safety system sensor, such as radar 36, is connected to the main controller 34 directly as shown in FIG. 2 or via a discrete input. Alternatively, the safety system sensor may be an ultrasonic or infrared sensor and the safety system 30 may include more than one safety system sensor. The radar 36 is capable of detecting reflective objects, such as vehicles, in the field of view of the radar 36. The radar 36 is also capable of sensing at least one of a forward object speed, forward object position and distance to the forward object. The radar 36 transmits messages or signals to the main controller 34 indicating the presence or the absence of objects in the field of view of the radar 36.

The vehicle safety system 30 comprises a camera 37 with a camera controller 38. The camera controller 38 is capable of detecting objects in the field of view of the camera 37 such as lane markings, traffic signs and other non-vehicle objects. The camera controller 38 will classify the different objects such that the vehicle safety system 30 recognizes which object is a pedestrian and which object is a traffic sign. The camera controller 38 then transmits messages or signals indicating the presence or absence of at least one visual object in the field of view of the camera 37. The camera controller 38 may also include functionality for warning a driver of an out of lane situation, such as Autovue® Lane Departure Warning System from Bendix Commercial Vehicle Systems LLC of Elyria, Ohio. The main controller 34 may receive a camera signal from the camera controller 36 via a discrete input or via the communications bus 42 as shown in FIG. 2.

A driver indicator 40 is located in the cab of the vehicle to indicate the status of the vehicle safety system to the driver. The driver indicator 40 may include a visual or audible indication to the driver that there is an issue with the safety system 30. The driver indicator communicates with both the brake controller 32 and the main controller 34 on the communications bus 42.

The main controller 34 may also receive information from a windshield wiper controller 44 on the vehicle. The information includes whether the windshield wipers are operating. For example, if the windshield wiper controller 44 has turned on the windshield wipers, the windshield wiper controller 40 transmits a message to the main controller 34. The main controller 34 may conclude that it is raining outside and that the visibility has decreased based on this message. The windshield wiper controller 44 may communicate directly with the main controller 34 or via the communications bus 42.

The main controller 34 may also receive information from a humidity sensor 46 on the vehicle. The humidity sensor 46 senses the level of humidity outside the vehicle and transmits the humidity level to the main controller 34 to use in determining the presence of rain or snow. The humidity sensor 46 may communicate directly with the main controller 34 or via the communications bus 42.

The main controller 34 may also receive information from a temperature sensor 48 on the vehicle. The temperature sensor 48 senses the temperature outside the vehicle and transmits the temperature to the main controller 34 to use in determining potential icy conditions. The temperature sensor 48 may communicate directly with the main controller 34 or via the communications bus 42.

Each of the windshield wiper controller 44, the humidity sensor 46 and the temperature sensor 48 may be considered environmental condition sensors, as each indicates a factor about the environment around the vehicle equipped with the vehicle safety system 30. Other environmental condition sensors are contemplated.

Therefore, a controller for a safety system comprises a sensor input for receiving a signal from a safety system sensor; a camera input for receiving a signal from a camera; and a processor having control logic. The control logic is capable of receiving the sensor signal indicating an absence of detected objects in a field of view of the safety system sensor; receiving the camera signal indicating at least one non-vehicle object identified in the field of view of the camera; and maintaining the active vehicle safety system as active in response to the sensor signal indicating the absence of detected objects and the camera signal indicating the identification of at least one visual non-vehicle object. In another embodiment, a controller for a safety system on a vehicle comprises a sensor input for receiving a signal from a safety system sensor; an input for receiving a signal indicative of an environmental condition; a camera input for receiving a signal from a vehicle mounted camera; and a processor having control logic. The control logic is capable of receiving the sensor signal indicating an absence of detected objects in the field of view of the safety system sensor; receiving the environmental condition signal indicating the environment is outside a (predetermined value; receiving the camera signal indicating a camera fault; and deactivating the active vehicle safety system in response to the sensor signal indicating the absence of detected objects, the environmental condition signal indicating the environment does not meet a predetermined value and the camera signal indicating a camera fault.

Therefore, a system for determining the status of a sensor in an active vehicle safety system comprises a sensor for detecting objects in a field of view of the sensor; a camera for identifying objects in a field of view of the camera; and a controller in communication with the sensor and the camera. The controller has control logic capable of receiving a sensor signal indicating of the absence of reflective objects in the field of view of the sensor; receiving a camera signal indicating at least one non-vehicle object identified in the field of view of the camera; and maintaining the active vehicle safety system as active in response to the sensor signal and the camera signal.

Figure 3:
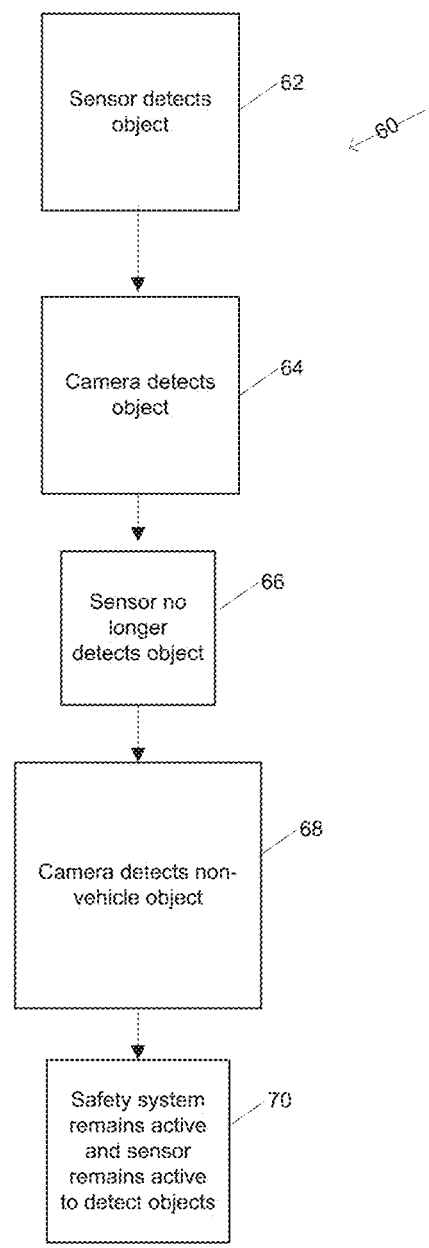
FIG. 3 illustrates a method of determining the operation of a sensor in the vehicle safety system, according to an example of the present invention.

A flowchart for implementing a method 60 of the present invention is shown in FIG. 3. In step 62, a safety system sensor, in this example radar 36, detects at least one object. The at least one object may be a forward vehicle or other reflective object in the field of view of the radar 36. A positive indication of the presence of an object in the field of view of the radar 36 information is transmitted to the main controller 34. In step 64, the camera controller 38 detects an object. The object does not necessarily need to be a vehicular or reflective object, but may be lane markings, traffic signs, humans, etc. in the field of view of the camera 37. The camera controller 38 likely detects an object different than what the radar 36 has detected due to the different field of view and different technology. The camera controller 38 will ensure there is no blur or other problem with the image prior to transmitting a positive indication of the presence of the object. The camera controller 38 then transmits a camera signal to the main controller 34.

In step 66, the radar 36 no longer detects the object or a predetermined time period has passed since the detection of the last object. In one example, the predetermined time period is about five minutes. A loss of the object can be caused by loss of angle quality or loss of reflected power, in the case of a radar sensor. Object stability or existence probability may result in the loss of the object during post-processing of the information from the radar 36. A signal indicative of the absence of the previously detected object in the field of view of the radar 36 is transmitted to the main controller 34.

In step 68, the camera controller 38 continues to transmit a signal regarding detection of at least one visual non-vehicle object identified in the field of view of the camera 37. In one example, the camera 37 is detecting only non-vehicular objects. The camera 37 is functional and the image is not blurred or impaired. The transmission continues during the same time period that the radar 36 is transmitting a signal indicating a loss of the detected object. The camera controller 38 may have classified the non-vehicular objects as lane markers or traffic signs.

In step 70, the main controller 34 maintains the safety system 30 as active in response to the signal from the radar 36 indicating no detected objects and the signal from the camera controller 38 indicating a non-vehicle object has been detected. The radar 36 will continue to monitor for reflective objects. While the camera controller 38 may not be used directly in operating the safety system 30, information from the camera controller 38 is used to confirm that the radar 36 is still operating but there is a lack of reflective objects and vehicles in the field of view of the radar 36.

Figure 4:
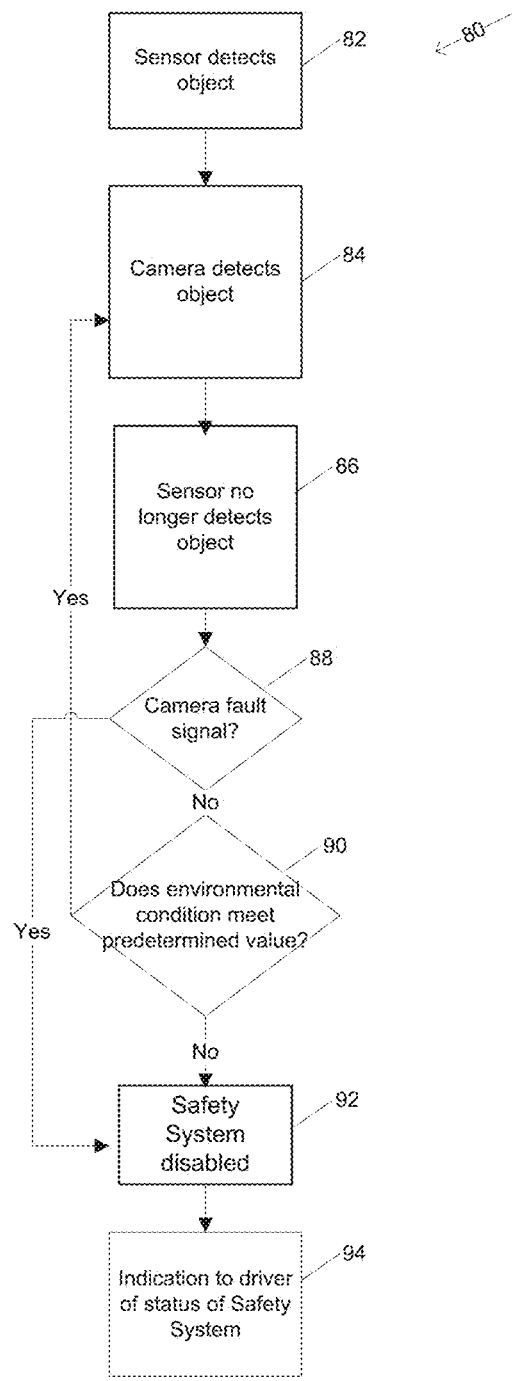
FIG. 4 illustrates another method of determining the operation of a sensor in the vehicle safety system, according to an example of the present invention.

In FIG. 4, method 80 according to another example of the invention is shown. In step 82, the sensor, in this example radar 36, detects an object. In step 84, the camera 37 detects an object. In step 86, the radar 34 no longer detects the object, similar to step 66 above.

In step 88, the method 80 determines if the camera controller 38 is transmitting a fault signal. The fault signal may be due to blurriness of the image. The image blurriness may be due to rain or snow on the windshield, which results in obstruction of the focus of the lens of the camera 37. The fault signal may also indicate saturation of the image due to excessive exposure or another problem with the operation of the camera 37. If the camera controller 38 sends a fault signal in step 88, the safety system 30 is disabled by the main controller 34 in step 92 since there can be no confirmation by the camera 37 of an object. If the camera controller 38 does not transmit a fault signal, the method 80 proceeds to step 90.

In step 90, the method 80 determines if an environmental condition meets a predetermined value. For example, if the environmental condition being monitored is windshield wiper operation, then the desired predetermined value is the windshield wipers are off. If the windshield wipers are on, the windshield wiper controller 44 transmits this information to the main controller 34. Since the environmental condition does not meet the predetermined value, the method 80 proceeds to step 92. In another example, if the environmental condition being monitored is temperature, then the predetermined value is above about 32° F. The temperature sensor 48 transmits the ambient external temperature to the main controller 34. If the temperature is less than about 32° F., then the environmental condition does not meet the predetermined value and the method 80 proceeds to step 92. In another example, if the environmental condition being monitored is humidity, then the predetermined value is less than about 90%. The humidity sensor 46 transmits the ambient humidity value to the main controller 34. If the humidity as measured by the humidity sensor 46 is greater than about 90%, the environmental condition does not meet the predetermined value and the method 80 proceeds to step 92.

In step 92, the main controller 34 deactivates the safety system 30 in response to the radar 36 no longer detecting an object and one of the camera controller 38 transmitting a fault and the environmental condition not meeting a predetermined value. In step 94, the indication of the status of the safety system 30 as deactivated is indicated to the driver using the driver indicator 40.

Therefore, a method for determining the status of a sensor in an active vehicle safety system comprises receiving a sensor signal indicating the absence of detected objects in the field of view of the sensor; receiving a camera signal indicating at least one visual object identified in the field of view of the camera; and maintaining the active vehicle safety system as active in response to the sensor signal indicating the absence of detected objects and the camera signal indicating at least one visual object.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A controller for a safety system on a vehicle comprising:
   a sensor input for receiving a signal from a safety system sensor;
   a camera input for receiving a signal from a camera;
   an environmental condition input for receiving a signal from an environmental condition device;
   an output for indication of the state of the active safety system; and
   a processor having control logic, the control logic capable of:
      receiving the sensor signal indicating an absence of detected forward objects in a field of view of the safety system sensor;
      receiving the camera signal indicating at least one non-vehicle forward object identified in the field of view of the camera;
      maintaining the active vehicle safety system as active in response to the sensor signal indicating the absence of detected forward objects and the camera signal indicating the identification of at least one visual non-vehicle forward object;
      deactivating the active vehicle safety system in response to the sensor signal indicating the absence of detected forward objects, the environmental condition device signal indicating the environment does not meet a predetermined value and the camera signal indicating a camera fault; and indicating at the output that the active vehicle safety system is deactivated.

2. The controller as in claim 1, wherein the sensor signal is received from a safety system sensor capable of sensing at least one of a forward object speed, position and distance.

3. The controller as in claim 1, wherein the camera signal is received from a vehicle mounted forward viewing camera capable of identifying at least one of a pedestrian, a lane marking and a traffic sign.

4. The controller as in claim 1, further comprising an environmental condition input for receiving a signal from an environmental condition device; wherein the control logic is further capable of receiving the environmental condition device signal indicating the environment does not meet a predetermined value; and deactivating the active vehicle safety system in response to the sensor signal indicating the absence of detected forward objects, the environmental condition device signal indicating the environment does not meet a predetermined value and the camera signal indicating a camera fault.

5. The controller as in claim 1, further comprising:
an output for indication of the state of the active safety system; wherein the control logic is further capable of: indicating that the active vehicle safety system is deactivated.

6. A method for maintaining an active vehicle safety system comprising:
receiving a sensor signal indicating the absence of detected reflective forward objects in the field of view of the sensor over a predetermined period of time;
receiving a camera signal indicating at least one visual non-vehicle forward object identified in the field of view of the camera;
maintaining the active vehicle safety system as active in response to the sensor signal indicating the absence of detected reflective forward objects and the camera signal indicating at least one visual non-vehicle forward object;
receiving an environmental condition device signal indicating the environment does not meet a predetermined value;
receiving a camera signal indicating a camera fault;
deactivating the active vehicle safety system in response to the sensor signal indicating the absence of detected forward objects, the environmental condition device signal indicating the environment does not meet the predetermined value and the camera signal indicating the camera fault; and
indicating the active vehicle safety system is deactivated.

7. The method as in claim 6, further comprising:
receiving an environmental condition signal indicating the environmental condition does not meet a predetermined value;
receiving the camera signal indicating a fault; and
deactivating the active vehicle safety system in response to the sensor signal, the environmental condition signal and the camera signal.

8. The method as in claim 6, further comprising: indicating that the active vehicle safety system is deactivated.

9. An active vehicle safety system comprising:
a sensor for detecting reflective objects in a field of view of the sensor;
a camera for identifying objects in a field of view of the camera;
an environmental condition device; and
a controller in communication with the sensor and the camera, the controller having control logic capable of:
receiving a sensor signal indicating the absence of reflective forward objects in the field of view of the sensor;
receiving a camera signal indicating at least one non-vehicle forward object identified in the field of view of the camera;
maintaining the active vehicle safety system as active in response to the sensor signal and the camera signal;
receiving an environmental condition device signal from the environmental condition device indicating the environment does not meet a predetermined value;
receiving a camera signal indicating a camera fault;
deactivating the active vehicle safety system in response to the sensor signal indicating the absence of detected forward objects, the environmental condition device signal indicating the environment does not meet the predetermined value and the camera signal indicating the camera fault; and
indicating the active vehicle safety system is deactivated.

10. The system as in claim 9, further comprising: a vehicle communications bus, wherein the sensor, the camera and the controller communicate over the vehicle serial communications bus.

11. The system as in claim 9, wherein the controller is integrated with the sensor.

12. The system as in claim 9, wherein the sensor is one of a radar, an ultrasonic sensor, an infrared sensor and a laser.

13. The system as in claim 9, further comprising: an environmental condition detection device; wherein the control logic is further capable of: receiving an environmental condition signal from the environmental condition detection device; receiving a camera signal indicating a camera fault; and deactivating the active vehicle safety system in response to the environmental condition signal indicating the environmental condition does not meet a predetermined value and the camera signal indicating a camera fault.

14. The system as in claim 13, wherein the environmental condition detection device is at least one of an ambient temperature sensor, a humidity sensor and a windshield wiper motor.

15. The method as in claim 6, wherein the predetermined period of time is about five minutes.

* * * * *